US009785516B2

(12) United States Patent
Schefe et al.

(10) Patent No.: US 9,785,516 B2
(45) Date of Patent: Oct. 10, 2017

(54) METHOD AND SYSTEM TO REMOVE A SERVICE FROM A DISTRIBUTED DATABASE SYSTEM

(71) Applicants: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(72) Inventors: Andre Schefe, Berlin (DE); Bernd Vorsprach, Berlin (DE); Henrik Hempelmann, Havelberg (DE); Martin E. Brunzema, Berlin (DE); Robin Wissbrock, Berlin (DE); Torsten Strahl, Kleinmachnow (DE)

(73) Assignee: SAP SE, Walldorf (DE)

(*) Notice: Subject to any disclaimer, the term of this patent is extended or adjusted under 35 U.S.C. 154(b) by 386 days.

(21) Appl. No.: 14/553,110

(22) Filed: Nov. 25, 2014

(65) Prior Publication Data
US 2016/0147818 A1    May 26, 2016

(51) Int. Cl.
*G06F 17/30* (2006.01)
*G06F 11/14* (2006.01)

(52) U.S. Cl.
CPC .... *G06F 11/1469* (2013.01); *G06F 17/30575* (2013.01); *G06F 11/1446* (2013.01); *G06F 2201/80* (2013.01)

(58) Field of Classification Search
None
See application file for complete search history.

(56) References Cited

U.S. PATENT DOCUMENTS

| 9,141,646 | B1* | 9/2015 | Shatdal | G06F 17/30289 |
| 9,519,664 | B1* | 12/2016 | Kharatishvili | G06F 17/30321 |
| 2012/0323852 | A1* | 12/2012 | Jain | G06F 17/30584 707/640 |
| 2014/0279930 | A1* | 9/2014 | Gupta | G06F 11/1464 707/683 |
| 2016/0164722 | A1* | 6/2016 | Zhu | H04L 41/082 709/221 |

OTHER PUBLICATIONS

Oracle Database, Oracle Clusterware and Oracle Real Application Clusters Administration and Deployment Guide, 10g Release 2, Jul. 2010.*

* cited by examiner

*Primary Examiner* — Tyler Torgrimson
(74) *Attorney, Agent, or Firm* — Buckley, Maschoff & Talwalkar LLC (57) ABSTRACT

A method, medium, and system to receive a request to remove a service of an instance of a distributed database system; redistribute data of the service to be removed to at least one remaining service of the distributed database system; save unsaved log segments of the service to be removed in a log backup; register removal of the service to be removed with the distributed database system; delete an entry of the service to be removed from a startup configuration of the distributed database system; halt operation of the service to be removed; and remove the halted service from internal topology information of the distributed database system.

30 Claims, 7 Drawing Sheets

```
RECEIVE A REQUEST TO REMOVE A SERVICE OF AN
INSTANCE OF A DISTRIBUTED DATABASE SYSTEM
                                           305
```

```
REDISTRIBUTE DATA OF THE SERVICE TO BE REMOVED
TO AT LEAST ONE REMAINING SERVICE OF THE
DISTRIBUTED DATABASE SYSTEM
                                           310
```

```
SAVE UNSAVED LOG SEGMENTS OF THE SERVICE
TO BE REMOVED IN A LOG BACKUP
                                           315
```

```
REGISTER REMOVAL OF THE SERVICE TO BE REMOVED
WITH THE DISTRIBUTED DATABASE SYSTEM TO
FACILITATE A REPLICATION OF THE REMOVAL BY
THE DISTRIBUTED DATABASE SYSTEM
                                           320
```

```
DELETE AN ENTRY OF THE SERVICE TO BE REMOVED
FROM A STARTUP CONFIGURATION OF THE
DISTRIBUTED DATABASE SYSTEM
                                           325
```

```
HALT OPERATION OF THE SERVICE TO BE REMOVED
BY AN OPERATING SYSTEM OF THE DISTRIBUTED
DATABASE SYSTEM
                                           330
```

```
REMOVE THE HALTED SERVICE FROM INTERNAL
TOPOLOGY INFORMATION OF THE DISTRIBUTED
DATABASE SYSTEM
                                           335
```

METHOD AND SYSTEM TO REMOVE A SERVICE FROM A DISTRIBUTED DATABASE SYSTEM

BACKGROUND

A distributed database may include multiple services and components that contribute to a unified, transaction consistent data set. While the multiple services of the database system may contribute to a system that can provide a number of different functions and capabilities, management of the services may, at times become unwieldy and/or costly. In some regards, and administrator of the databases system may want to remove some of the services of the database system. While a service may be stopped or shut down in some prior system configurations, there may be issues related to, for example, recovery of the database system that fully accounts for the removal of a service. In some aspects, the database system may restore the database system to an initial state that included the service removed post-startup. In some instances, a removal of a service after a last savepoint in time may not be fully, accurately, or efficiently captured and reflected in a recovery mechanism or process of the databases system.

In some contexts, such as a distributed database system, a desire may exist to remove a service of the operational database system by a user of the system.

DETAILED DESCRIPTION

The following description is provided to enable any person in the art to make and use the described embodiments. Various modifications, however, will remain readily apparent to those in the art.

Figure 1:
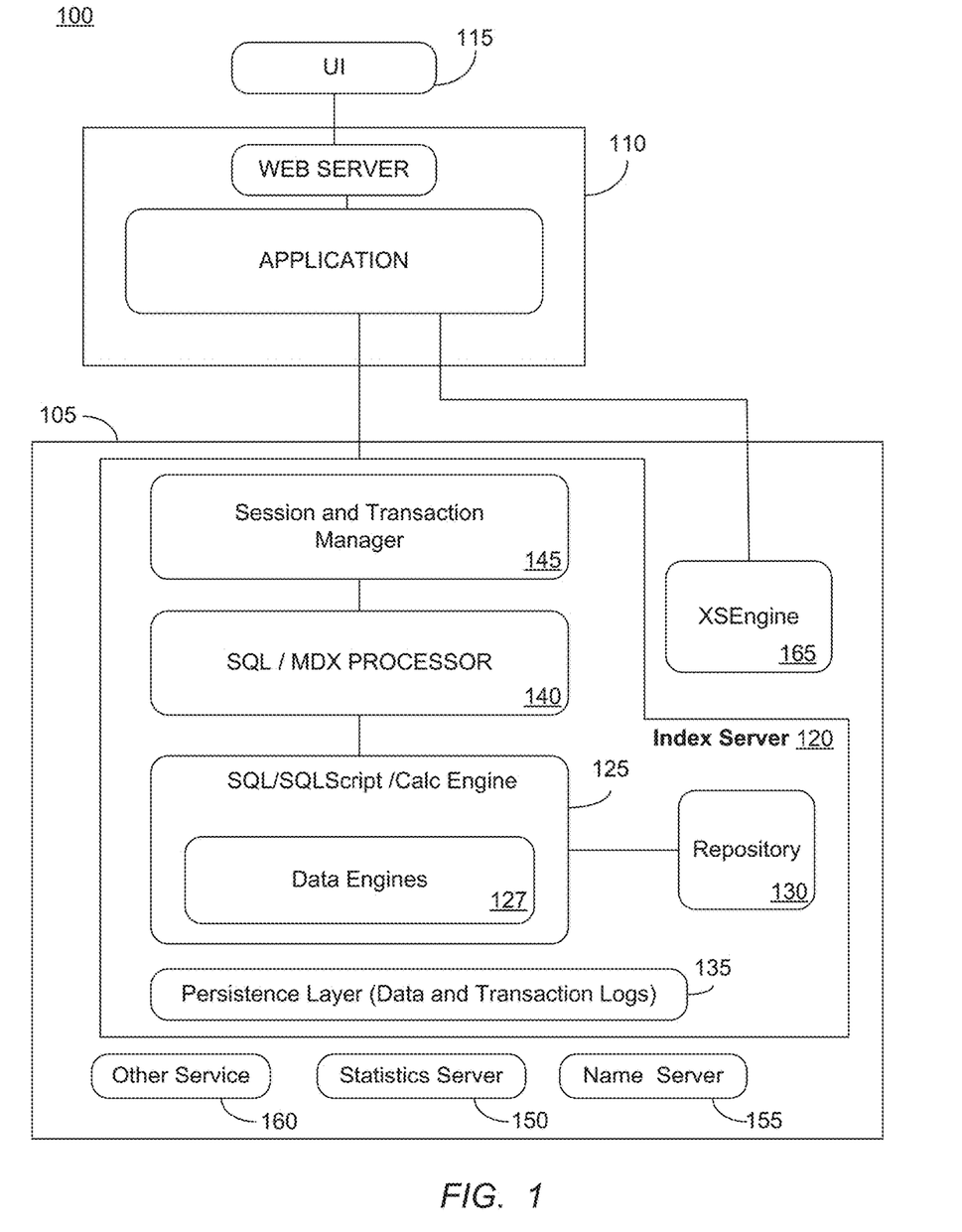
FIG. 1 is a schematic diagram of a logical architecture for a system, according to some embodiments.

FIG. 1 is a block diagram of system 100 according to some embodiments. System 100 includes database system 105, a web server 110, and a user interface 115. Database system 105 may include other components not specifically depicted in FIG. 1, For example, System 100 may also include one or both of backup files and a backup tool (not shown in FIG. 1). The backup files and backup tool may each store data backups and/or log backups, with backup files being located in a namespace of application server and backup tool being an external backup tool.

Database system 105 may comprise any query-responsive data source or sources that are or become known, including but not limited to a structured-query language (SQL) relational database management system. Database system 105 may comprise a relational database, a multi-dimensional database, an eXtendable Markup Language (XML) document, or any other data storage system storing structured and/or unstructured data. Database system 105 may comprise a distributed database system having data thereof distributed among several relational databases, multi-dimensional databases, and/or other data sources. Embodiments are not limited to any number or types of data sources. For example, database system 105 may comprise one or more OnLine Analytical Processing (OLAP) databases, spreadsheets, text documents, presentations, etc.

A main component of a distributed database system in some embodiments herein, including FIG. 1, is an index server 120. Database system 105 may implement an "in-memory" database, in which volatile (e.g., non-disk-based) storage repository 130 (e.g., Random Access Memory) is used both for cache memory and for storing the full database during operation, and persistent storage layer (e.g., one or more fixed disks, flash memory, solid state storage device, etc.) is used for offline persistency and maintenance of database snapshots. Alternatively, volatile storage 130 may be used as cache memory for storing recently-used data, while persistent storage layer 135 stores the full database. In some embodiments, the data of database system 105 comprises one or more of conventional tabular data, row-based data stored in row format, column-based data stored in columnar format, and object-based data. Database system 105 may also or alternatively support multi-tenancy by providing multiple logical database systems which are programmatically isolated from one another. Moreover, the data of database system 105 may be indexed and/or selectively replicated in an index to allow fast searching and retrieval thereof.

Database system 105 may store metadata regarding the structure, relationships and meaning of the data stored within database system 105. This information may be generated by a database administrator and may include data defining the schema of database tables stored within database system 105. A database table schema may specify the name of the database table, columns of the database table, the data type associated with each column, and other information associated with the database table.

Database calculation engine 125 may manage repository 130 and persistent storage layer 135, and provide data of database system 105 to database clients, via web server 110, in response to requests received therefrom.

In some embodiments, an administrator may communicate using one or more devices executing program instructions of a software application for removing a service of an instance of database system 105. Database calc engine 125 may be configured to provide multiple types of services or processes. The main component of database system 105 is the index service that contains the actual data stores and the engines 127 for processing the actual data of the database system. The index service may operate to provide authorization, session management and transaction management of SQL or MDX statements in the contexts of authenticated sessions and transactions using session and transaction manager 145 and SQL/MDX processor 140, as well as managing persistence between cached memory images of database objects, log files, and permanent storage files. Other types of services include, but are not limited to, a service for monitoring and providing alerts regarding the services comprising the database system (i.e., a "statistic server" 150); services that manage other services such as, for example, "name server" 155 that owns the information regarding the topology of the database system, including where the services and components are running and what data is located on the servers comprising the database; an Extended Services (XS) Engine 165 that is a web server with privileged access to the database that can connect clients to the database to fetch data via HTTP, and other services 160 to run scripts, applications and other components.

An administrator may provide management of database system 105 via a device or system (not shown) in communication with database system 105 through, for example, user interface 115. For example, the administrator may define the structure of tables within database system 105, may configure hosts within database system 105, may schedule backup operations performed by database calc engine 125, and may control database 125 to execute post-crash recovery of database system 105 based on data backups and, if desired, log backups. In some instances, the administrator (or other authorized entity) may want to remove a service, process, or component of the distributed database system 105. As used herein, the terms service, process, or component may be used interchangeably unless otherwise stated. In some instances, the database administrator may want to reduce the number of services participating in an instance of the distributed database system 105. Reasons the administrator may desire the removal of one or more services from a distributed database system may be varied and can include, for example, a desire to conserve or reduce costs of ownership of the database system. Furthermore, the administrator would like to remove the service(s) in a manner without risking a loss of data, losing data consistency of the database, and maintaining database recoverability.

Figure 2:
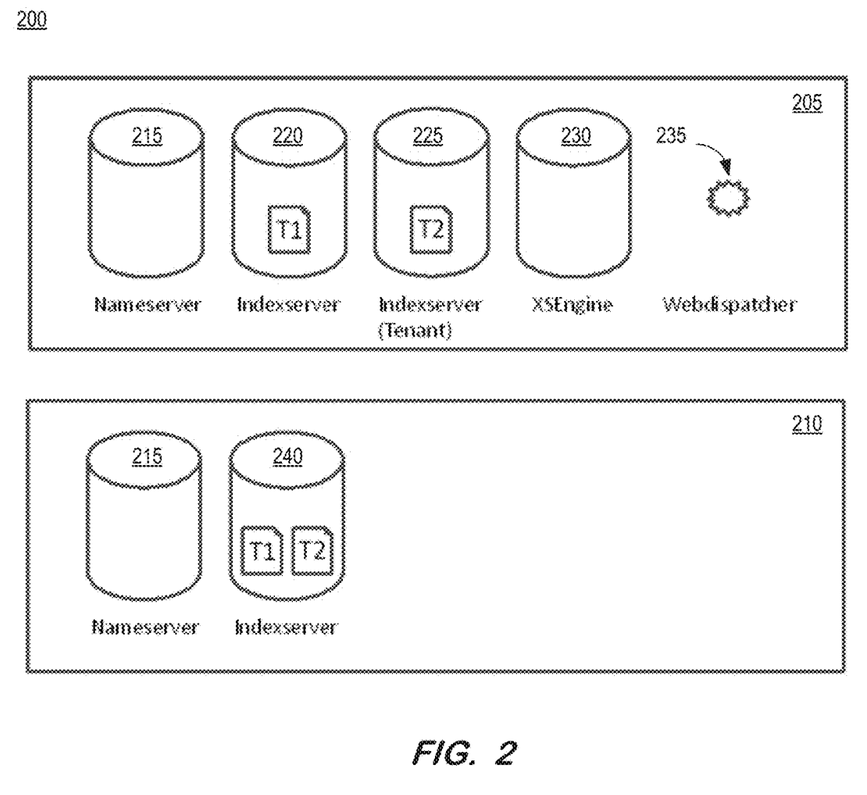
FIG. 2 is an illustrative depiction of a system, in various states, according to some embodiments herein.

FIG. 2 is an illustrative depiction of a system 200, including a logical representation of a number of services participating in an instance of a distributed database system. As shown at a first state 205 regarding the services of the database system, the database system comprises a nameserver 215, a (main) indexerver 220, a (tenant) indexserver 225, and XSEngine 230, and a web dispatcher 235. In some embodiments, more, fewer, alternative, substitute, and other services may be included in the initial system configuration 205 to provide functionalities similar to and/or different than the functionalities provided by the particular services shown in the example of FIG. 2, without any loss of generality herein. As shown, indexesrver 220 stores and manages a first data table T1 and indexesrver 225 stores and manages a second data table T2.

Regarding database system 200, an administrator may like to remove as many of the services comprising the database as possible, while maintaining a core functionality of the database. In some embodiments of an implementation of a SAP HANA distributed database system developed by SAP SE, the nameserver cannot be removed and at least one indexserver must be included in the database. Accordingly, a second state 210 regarding the services of the database system after the removal of as many services as possible comprises nameserver 215 and indexserver 240. At 210, all of the indexservers (e.g., 220, 225) have been moved to one indexserver 240 such that the data previously stored by all of the different indexservers is now stored by the one remaining indexserver. In some instances, indexserver 240 may be indexserver 220 that is updated to include the data of the other indexservers (e.g., indexserver 225) from the initial system configuration 205. In some aspects, the data of the indexservers 220 and 225 is referred to herein as being redistributed to indexserver 240.

In the second state 210, the persistent data of the XSEngine has been removed and the server process thereof stopped. The XSEngine is a type of service that may have associated data but the data need not be redistributed or persisted when the service is removed. The web dispatcher service 235 is a type of service that does not have persistent data, and thus the server process thereof was stopped without a need to redistribute or remove associated data.

Figure 3:
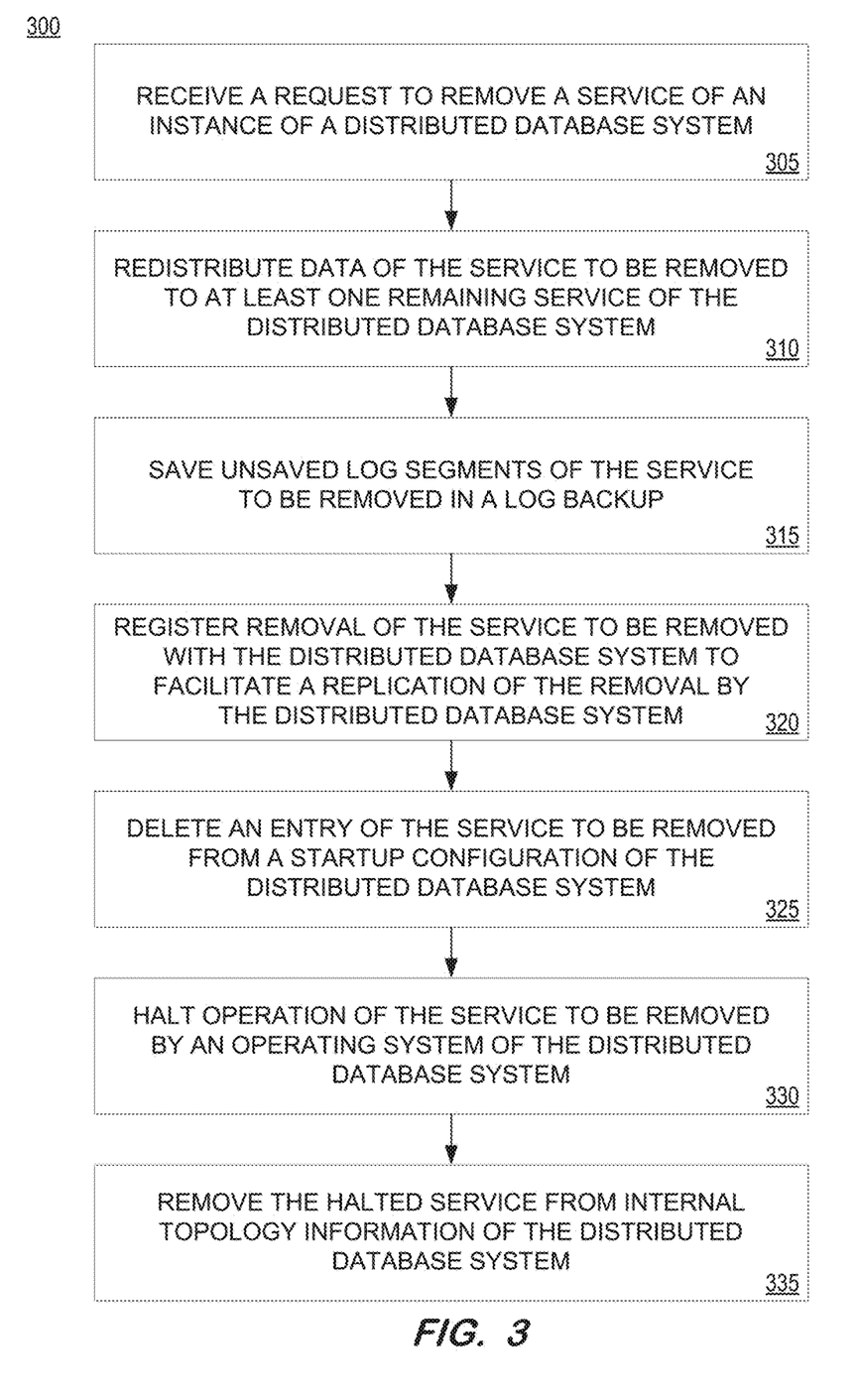
FIG. 3 is an illustrative flow diagram of a process, according to some embodiments.

Referring to FIG. 3, a process related to providing a platform or framework for removal a service of a distributed database system is disclosed. Process 300 may be implemented by a system, application, or apparatus configured to execute the operations of the process. In general, process 300 relates to a process to safely and efficiently remove a service from a distributed database system, including notifying other components of the database system of the database's new configuration (i.e., post-removal of the service). In some embodiments, various hardware elements of an apparatus, device or system embodying system 100 executes program instructions to perform process 300. In some embodiments, hard-wired circuitry may be used in place of, or in combination with, program instructions for implementation of processes according to some embodiments. Program instructions that can be executed by a system, device, or apparatus to implement process 300 (and other processes disclosed herein) may be stored on or otherwise embodied as non-transitory, tangible media. Embodiments are therefore not limited to any specific combination of hardware and software.

Prior to operation 305, services executing on a device or a server-side computing device (e.g., an application server) of a distributed database system may be developed and deployed. Process 300 may facilitate and support removal of a service comprising an instance of the distributed database system, including embodiments where different services and components are hosted by different devices, systems, and subsystems.

At operation 305, a request to remove a service from an instance of the distributed database system is received. The request may be received from an administrator (or other entity). The request may specify a particular type or types of service functionality that are to be removed, a removal of service(s) satisfying a certain criteria (e.g., services not used for a period of time, services using a certain percentage of system resources, etc.), and other indications of one or more services to be removed. In some instances, one or more services may be removed until a certain percentage or other quantity of resources are freed and thus made available for other services and components. In some instances, the request may be for a specific service, where the service is specified by its particular name, version, volume, etc.

At operation 305, the service to be removed may be marked, flagged, or otherwise indicated as being unavailable for new data and locked for assigning of new tables or table partitions. Data already stored and/or persisted for the service to be removed may be accessed for queries and other operations. No new table or table partitions can be created on or moved to the service to be removed in reply to the receipt of the request to remove the service indicated in the request at 305.

At operation 310, data content of the service to be removed is redistributed or reorganized to other remaining services of the database system. In some embodiments, the data content of the service to be removed is redistributed to new storage locations of one or more services of the same type. For example, index service data (i.e., user and meta data) for an index service designated for removal (e.g., indexserver A) may be redistributed to other index services (e.g., indexserver B and indexserver C) of the database system. New and changed data content is written to the new locations and other data associated with the service to be removed is also moved to the new locations.

In some embodiments, certain services may be required for proper operation of an implementation of a database system. As such, at least one instance of these such required services may be maintained (e.g., an "index service" for SAP HANA). Other types of services, including services used for monitoring or script processing that do not impact database operations per se, may be removed without redistribution of the data associated therewith (e.g., XSEngine, etc.), where the local content data associated with the service to be removed may be "dropped" or deleted. Some other services do not have any local content associated therewith and therefore will not invoke the data reorganization aspects of operations 305 and 310.

In some embodiments, a determination may be made to determine whether the data of the service to be removed is to be reorganized, in accordance with some aspects herein. This determination should logically be made prior to the data distribution or reorganization aspects of operations 305 and 310. In some aspects, this determination may comprise a portion of operation 305 or be performed before or in parallel with other aspects of operation 305.

Upon completion of the data reorganization aspects of operations 305 and 310 (as determined to be needed), all unsaved log segments of the service to be removed are saved to log backups of the distributed database system. It is noted that log backups of log segments of a database system service may typically be written to a log backup with a "best afford" approach asynchronously. In this approach, if a log segment buffer becomes "full" and/or a predetermined time threshold is surpassed, then the log segment is closed and queued for backup and processed one after the other. The log area (i.e., all log segments on disk) for the service to be removed may be deleted after the removal of the service to be removed is completed (e.g., during a "clean-up" in some aspects of some embodiments herein, as will be discussed in greater detail below).

In accordance with some embodiments herein, a final log backup is performed before the service to be removed is stopped at operation 315. Operation 315 may be invoked in reply to the request to remove a service. In some aspects, the backup of all remaining unsaved log segments are performed synchronously.

Process 300 may proceed to register the requested service removal action with other components of the distributed database system at operations 320 and 325, including, for example, a backup catalog and a master index service's transaction log. At operation 320, a "remove service" redo log entry is written by a master indexserver. The redo log entry includes changes occurring after a last imaging savepoint that have not yet been committed by the database system. In some aspects, saving the redo log entry may enable the database system to, for example, repeat the service removal operation(s) in the event the database crashes and needs to be restarted, to perform a redo of the service removal operation during a recovery, and to mirror the service removal behavior on another (standby) database instance.

Operation 320 may further include aspects to write a "remove service" entry to the backup catalog of the database system. The entry into the backup catalog may document the removal of the volume of the service to be removed. In some aspects, the entry in the backup catalog may enable the database system to skip the restoration of the service to be removed during recovery if the database is to be recovered to a point in time after the service was removed. In an instance the database is to be recovered to a point in time before the removal of the service as requested, the recovered database will include the service per a snapshot image of the database taken before the removal of the service.

At operation 325, an entry of the service to be removed is deleted from a startup configuration of the distributed database system. In some embodiments of an implementation of an instance of a SAP HANA database system herein, the service to be removed is deleted from the list of services contained in a configuration file (e.g., "daemon.ini"). The "daemon.ini" configuration file may define the set of parameters to be started by the SAP HANA daemon process during startup of the database instance. Deletion of the entry corresponding to the service to be removed will operate to disable the service on a database restart.

Proceeding with process 300, operation 330 includes stopping the service to be removed. In some aspects, it may not be possible to notify the database daemon directly of the service removal. Accordingly, the configuration is changed (i.e., the service is removed) and the daemon is notified of the change in the configuration (".ini") file.

At operation 335, the topology of the database system is "cleaned-up" after the service requested to be removed has been stopped (operation 330). The internal topology information of the database includes the location where each registered service of the database system is located, the state, and the volume configurations of the database. In some aspects, the topology information includes configuration data and meta information related to the location, state, and volume configuration. Operation 335, removes the service from the internal topology information of the removed service of the database system, including the location, state, and volume configuration of the removed service.

Figure 4:
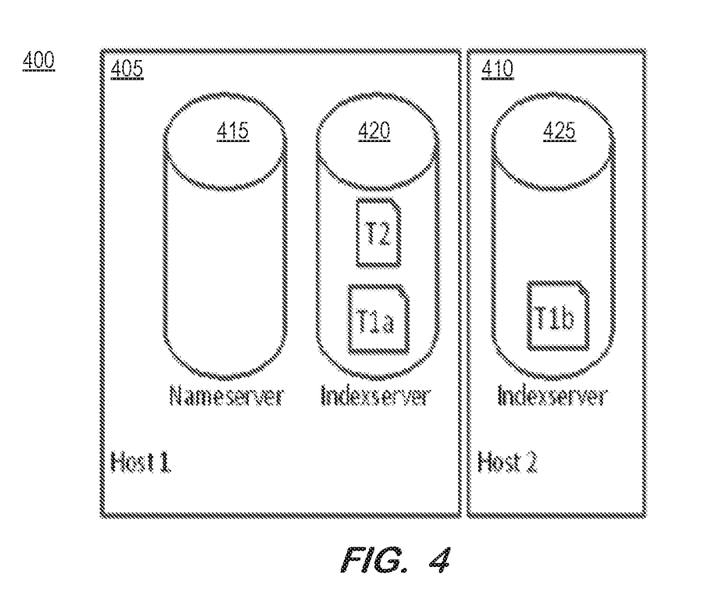
FIGS. 4-7 are illustrative depictions of some aspects of a system at various stages of a process, according to some embodiments.

FIGS. 4-7 are illustrative depictions of some aspects of a system at various stages of a process, according to some embodiments herein. In some regards, FIGS. 4-7 may correspond, at least in part, to some of the operations of process 300 of FIG. 3. In some embodiments, FIG. 4 is an illustrative depiction of a distributed database system at an initial or first state 400, where the system includes two hosts. The database system includes a first host 405 including a nameserver 415 and an indexserver 420 and a second host 410 having an indexserver 425. A table T1 is partitioned on first host 405 at indexserver 420 and on second host 410 at indexserver 425. While in the initial state, database system 400 receives a request to remove second host 410. In reply to that request, no new tables or table partitions are created on the service to be removed (i.e., indexserver 425 on second host 410). Accordingly, a new table, T2, which is created after the request to remove the second host 410 is received, is created on first host 405 only. FIG. 4 corresponds, at least in part, to aspects of FIG. 3, operation 305.

Figure 5:
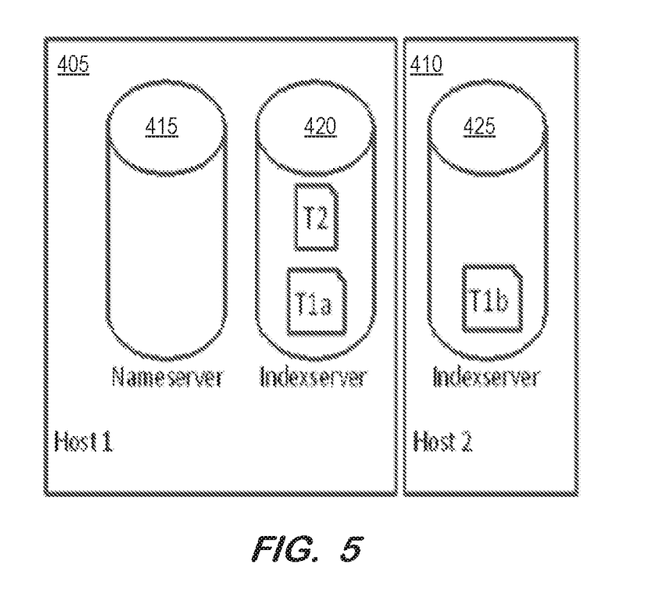

In some aspects, FIG. 5 is an illustrative depiction of the distributed database system of the present example illustrating a redistribution or reorganization of the data stored on the service to be removed (i.e., second host 410). As illustrated in FIG. 5, data of T1 (i.e., T1b) which was previously stored on the second host 410 at indexserver 425 at an initial or first state 400, has be redistributed to the first host 405, indexserver 420. FIG. 5 corresponds, at least in part, to aspects of FIG. 3, operation 310.

Figure 6:
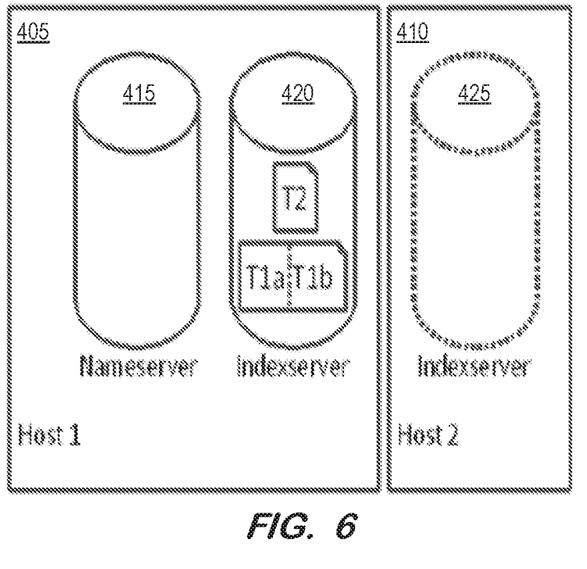

In some aspects, FIG. 6 is an illustrative depiction of the distributed database system of the present example illustrating a removal of the requested service from a configuration of the database system. As illustrated in FIG. 6 by the phantom-line drawing of indexserver 425 on the second host 410, indexserver 425 is removed from the configuration of the database. The removal of the second host from the configuration of the database may correspond to, at least in part, operations 315, 320, and 325 of FIG. 3.

Figure 7:
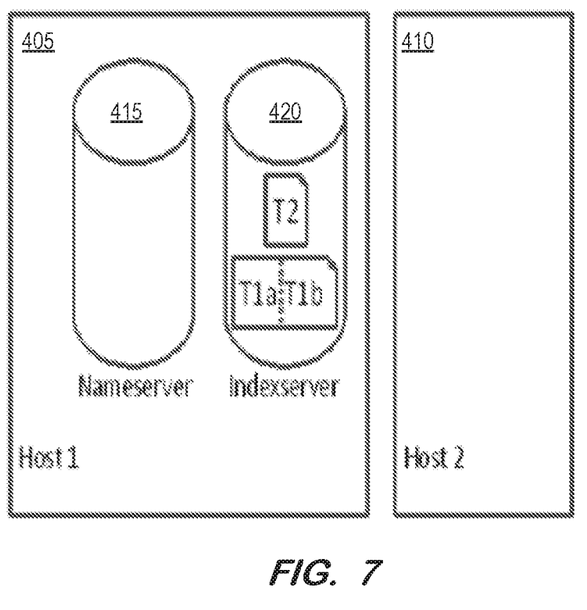

In some regards, FIG. 7 is a representative depiction of the distributed database system of the present example illustrating the database system of the present example after the indexserver on the second host has been stopped. In some aspects, FIG. 7 reflects the stoppage of indexserver 425, as well as the cleanup of the database related to the removal operation. In some aspects, operations 330 and 335 may be performed to achieve the results shown in FIG. 7, including the removal of indexserver 425 from the internal topology information of the database system.

Figure 8:
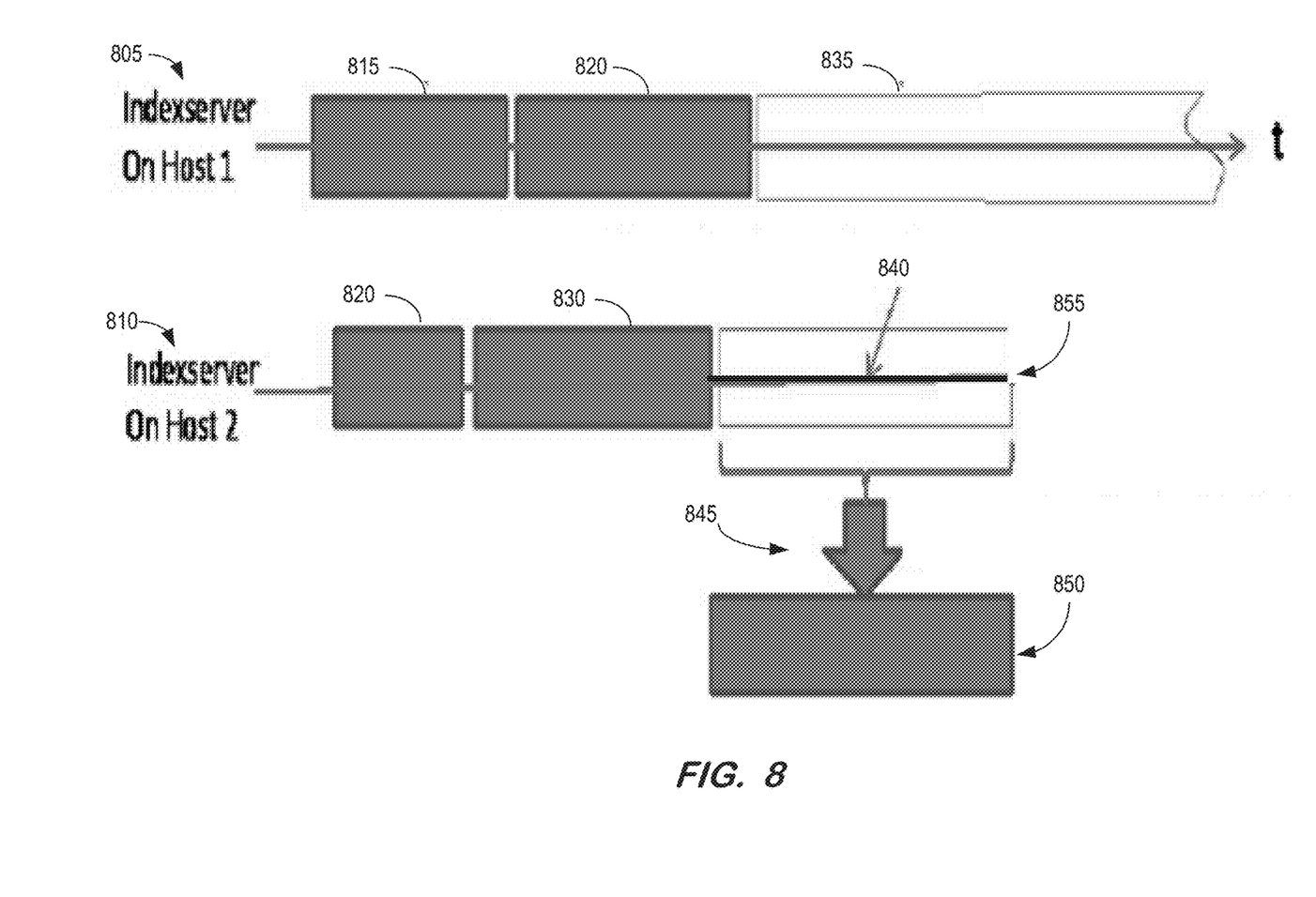
FIG. 8 is an illustrative depiction of some aspects of a system, according to some embodiments.

FIG. 8 is an illustrative depiction of some aspects of a system, according to some embodiments herein. In particular, FIG. 8 represents some aspects of a service removal operation, including the writing of data log segments in accordance with some embodiments herein. As an example, FIG. 8 relates to the example of FIGS. 4-7. FIG. 8 includes a representation of log backups for the indexserver (420) on the first host (405) and the indexsever (425) on the second host (410), relative to each other against a common timeline where time increases from left to right. As illustrated by the shaded log segments, the log segments 815 and 820 of the indexserver on the first host and the log segments of the 825 and 830 of the indexserver on the second host have been written to log backups. The log segments 835 of the indexserver on the first host and the log segment 840 on the indexserver of the second host have not yet been saved. In particular, log segment 840 on the indexserver of the second host has not yet been saved when a request is received to remove the second host (i.e., remove the indexserver on the second host). In accordance with some aspects herein and in reply to the request, no new data is stored on the service to be removed (i.e., the indexserver on the second host), the unsaved log segment 840 is written to a log backup at 845 and saved as saved log segment 850. This aspect of writing the unsaved data to a log backup in response to the request to remove the service is discussed hereinabove (e.g., FIG. 3, operation 315). At a point in time 855 after the unsaved log segments have been saved (and other operations have been performed), the indexserver on the second host is stopped and removed from the database system. The service may be removed in accordance with operations 330 and 335 as discussed above.

Figure 9:
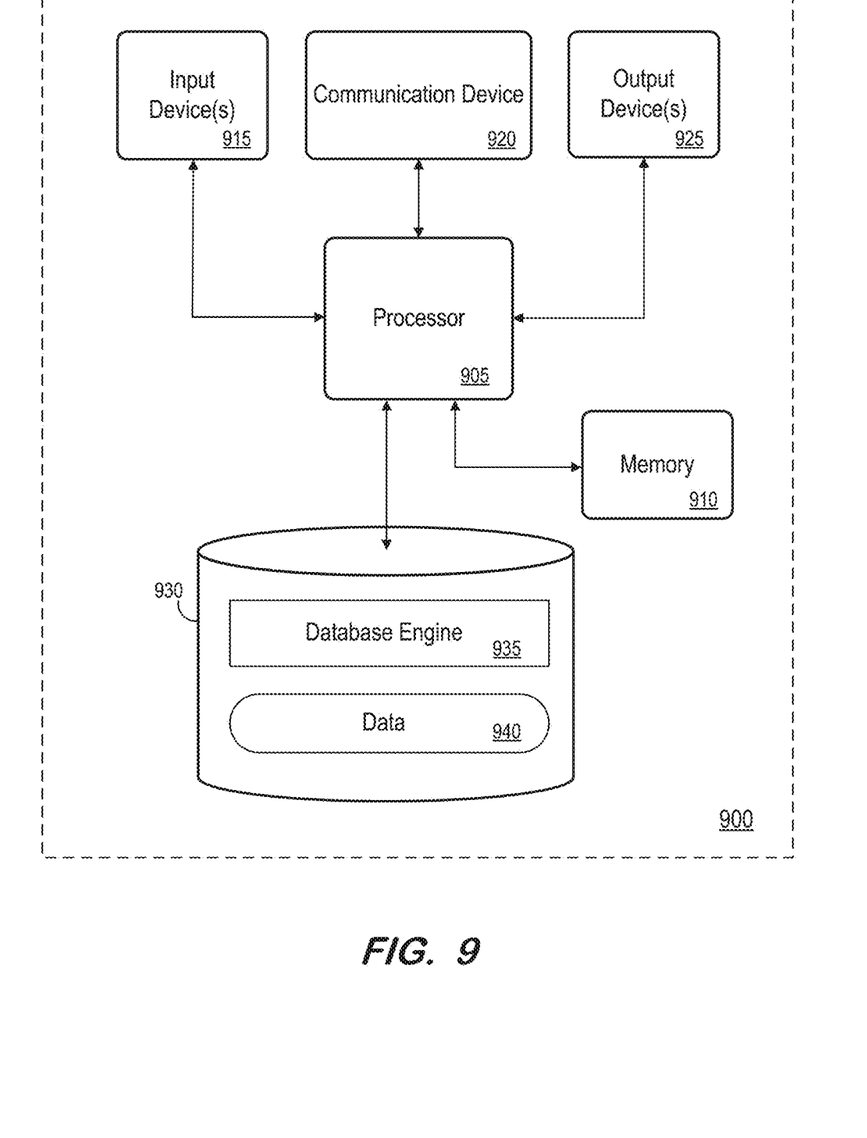
FIG. 9 is a block diagram of a computing device, in accordance with some embodiments.

FIG. 9 is a block diagram of a computing device, in accordance with some embodiments. System 900 may be, for example, associated with devices for implementing the processes disclosed herein. System 900 comprises a processor 905, such as one or more commercially available Central Processing Units (CPUs) in the form of one-chip microprocessors or a multi-core processor, coupled to a communication device 920 configured to communicate via a communication network (not shown in FIG. 9) to another device or system (e.g., an administrator device or a client device, not shown). System 900 may also include a cache 910, such as RAM memory modules. The system may further include an input device 915 (e.g., a touchscreen, mouse and/or keyboard to enter content) and an output device 925 (e.g., a touchscreen, a computer monitor to display, a LCD display).

Processor 905 communicates with a storage device 930. Storage device 930 may comprise any appropriate information storage device, including combinations of magnetic storage devices (e.g., a hard disk drive), optical storage devices, solid state drives, and/or semiconductor memory devices. In some embodiments, storage device 930 may comprise a database system, including in some configurations an in-memory database.

Storage device 930 may store program code or instructions to control an operation of database engine 935 to remove a service from a distributed database system, in accordance with processes herein. Processor 905 may perform the instructions for implementing database engine 935 to thereby operate in accordance with any of the embodiments described herein. Database engine 935 may be stored in a compressed, uncompiled and/or encrypted format. Program instructions for database engine 935 may furthermore include other program elements, such as an operating system, a database reporting system, and/or device drivers used by the processor 905 to interface with, for example, a client, an administrator, and peripheral devices (not shown in FIG. 9). Storage device 930 may also include data 940. Data 940 may be used by system 900, in some aspects, in performing one or more of the processes herein, including individual processes, individual operations of those processes, and combinations of the individual processes and the individual process operations. For example, data 940 may comprise a persistence layer of a database system, in accordance with some embodiments herein.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

In some embodiments, aspects herein may be implemented by an application, device, or system to manage recovery of an entity or other application in a consistent manner across different devices, effectively across an entire domain.

Although embodiments have been described with respect to certain contexts, some embodiments may be associated with other types of devices, systems, and configurations, either in part or whole, without any loss of generality.

The embodiments described herein are solely for the purpose of illustration. Those in the art will recognize other embodiments which may be practiced with modifications and alterations.

What is claimed is:

1. A method implemented by a computing system in response to execution of program instructions by a processor of the computing system, the method comprising:
   receiving a request to remove a service of an instance of a distributed database system;
   determining whether the data of the service to be removed is to be redistributed;
   redistributing, in an instance it is determined that the data of the service to be removed is to be redistributed, data of the service to be removed to at least one remaining service of the distributed database system;
   saving unsaved log segments of the service to be removed in a log backup;
   registering removal of the service to be removed with the distributed database system to facilitate a replication of the removal by the distributed database system;
   deleting an entry of the service to be removed from a startup configuration of the distributed database system;
   halting operation of the service to be removed by an operating system of the distributed database system; and
   removing the halted service from internal topology information of the distributed database system.

2. The method of claim 1, wherein
in an instance it is determined that the data of the service to be removed is not to be redistributed, proceeding with the removal of the service without redistributing the data of the service to be removed.

3. The method of claim 1, wherein criteria for the determining of whether the data of the service to be removed is to be redistributed includes, at least in part, the type of service to be removed.

4. The method of claim 1, wherein the registering of the removal of the service to be removed comprises,
writing a redo log entry to a master index server of the distributed database system; and
writing an entry referencing a removal of the service to be removed in a backup mechanism of the distributed database system.

5. The method of claim 1, wherein the deleting of an entry of the service to be removed from a startup configuration of the distributed database system causes the distributed database system to disable the service on a restart thereof.

6. The method of claim 1, wherein the internal topology information of the distributed database system stores meta data associated with a location, a state, a volume configuration, and combinations thereof for the service to be removed.

7. A non-transitory medium storing processor-executable program instructions, the medium comprising program instructions executable by a processor to:
receive a request to remove a service of an instance of a distributed database system;
determine whether the data of the service to be removed is to be redistributed;
redistribute, in an instance it is determined that the data of the service to be removed is to be redistributed, data of the service to be removed to at least one remaining service of the distributed database system;
save unsaved log segments of the service to be removed in a log backup;
register removal of the service to be removed with the distributed database system to facilitate a replication of the removal by the distributed database system;
delete an entry of the service to be removed from a startup configuration of the distributed database system;
halt operation of the service to be removed by an operating system of the distributed database system; and
remove the halted service from internal topology information of the distributed database system.

8. The non-transitory medium of claim 7, further comprising instructions executable by a processor to:
in an instance it is determined that the data of the service to be removed is not to be redistributed, proceed with the removal of the service without redistributing the data of the service to be removed.

9. The non-transitory medium of claim 7, wherein criteria for the determining of whether the data of the service to be removed is to be redistributed includes, at least in part, the type of service to be removed.

10. The non-transitory medium of claim 7, wherein the instructions executable by a processor to register the removal of the service to be removed comprises:
instructions to write a redo log entry to a master index server of the distributed database system; and
instructions to write an entry referencing a removal of the service to be removed in a backup mechanism of the distributed database system.

11. The non-transitory medium of claim 7, wherein the deleting of an entry of the service to be removed from a startup configuration of the distributed database system causes the distributed database system to disable the service on a restart thereof.

12. The non-transitory medium of claim 7, wherein the internal topology information of the distributed database system stores meta data associated with a location, a state, a volume configuration, and combinations thereof for the service to be removed.

13. A computing system comprising:
a memory storing processor-executable program code; and
a processor to execute the processor-executable program instructions in order to cause the computing system to:
receive a request to remove a service of an instance of a distributed database system;
determine whether the data of the service to be removed is to be redistributed;
redistribute, in an instance it is determined that the data of the service to be removed is to be redistributed, data of the service to be removed to at least one remaining service of the distributed database system;
save unsaved log segments of the service to be removed in a log backup;
register removal of the service to be removed with the distributed database system to facilitate a replication of the removal by the distributed database system;
delete an entry of the service to be removed from a startup configuration of the distributed database system;
halt operation of the service to be removed by an operating system of the distributed database system; and
remove the halted service from internal topology information of the distributed database system.

14. The system of claim 13, wherein the processor is further to execute the processor-executable instructions in order to cause the computing system to:
in an instance it is determined that the data of the service to be removed is not to be redistributed, proceed with the removal of the service without redistributing the data of the service to be removed.

15. The system of claim 13, wherein criteria for the determining of whether the data of the service to be removed is to be redistributed includes, at least in part, the type of service to be removed.

16. The system of claim 13, wherein the processor is further to execute the processor-executable instructions in order to cause the computing system to:
write a redo log entry to a master index server of the distributed database system; and
write an entry referencing a removal of the service to be removed in a backup mechanism of the distributed database system.

17. The system of claim 13, wherein the deleting of an entry of the service to be removed from a startup configuration of the distributed database system causes the distributed database system to disable the service on a restart thereof.

18. The system of claim 13, wherein the internal topology information of the distributed database system stores meta data associated with a location, a state, a volume configuration, and combinations thereof for the service to be removed.

19. A method implemented by a computing system in response to execution of program instructions by a processor of the computing system, the method comprising:

receiving a request to remove a service of an instance of a distributed database system;

redistributing data of the service to be removed to at least one remaining service of the distributed database system;

saving unsaved log segments of the service to be removed in a log backup;

registering removal of the service to be removed with the distributed database system to facilitate a replication of the removal by the distributed database system;

deleting an entry of the service to be removed from a startup configuration of the distributed database system;

halting operation of the service to be removed by an operating system of the distributed database system; and removing the halted service from internal topology information of the distributed database system.

20. The method of claim 19, wherein the registering of the removal of the service to be removed comprises, writing a redo log entry to a master index server of the distributed database system; and writing an entry referencing a removal of the service to be removed in a backup mechanism of the distributed database system.

21. The method of claim 19, wherein the deleting of an entry of the service to be removed from a startup configuration of the distributed database system causes the distributed database system to disable the service on a restart thereof.

22. The method of claim 19, wherein the internal topology information of the distributed database system stores meta data associated with a location, a state, a volume configuration, and combinations thereof for the service to be removed.

23. A non-transitory medium storing processor-executable program instructions, the medium comprising program instructions executable by a processor to:

receive a request to remove a service of an instance of a distributed database system;

redistribute data of the service to be removed to at least one remaining service of the distributed database system;

save unsaved log segments of the service to be removed in a log backup;

register removal of the service to be removed with the distributed database system to facilitate a replication of the removal by the distributed database system;

delete an entry of the service to be removed from a startup configuration of the distributed database system;

halt operation of the service to be removed by an operating system of the distributed database system; and remove the halted service from internal topology information of the distributed database system.

24. The non-transitory medium of claim 23, wherein the instructions executable by a processor to register the removal of the service to be removed comprises:

instructions to write a redo log entry to a master index server of the distributed database system; and instructions to write an entry referencing a removal of the service to be removed in a backup mechanism of the distributed database system.

25. The non-transitory medium of claim 23, wherein the deleting of an entry of the service to be removed from a startup configuration of the distributed database system causes the distributed database system to disable the service on a restart thereof.

26. The non-transitory medium of claim 23, wherein the internal topology information of the distributed database system stores meta data associated with a location, a state, a volume configuration, and combinations thereof for the service to be removed.

27. A computing system comprising:

a memory storing processor-executable program code; and a processor to execute the processor-executable program instructions in order to cause the computing system to:

receive a request to remove a service of an instance of a distributed database system;

redistribute data of the service to be removed to at least one remaining service of the distributed database system;

save unsaved log segments of the service to be removed in a log backup;

register removal of the service to be removed with the distributed database system to facilitate a replication of the removal by the distributed database system;

delete an entry of the service to be removed from a startup configuration of the distributed database system;

halt operation of the service to be removed by an operating system of the distributed database system; and remove the halted service from internal topology information of the distributed database system.

28. The system of claim 27, wherein the processor is further to execute the processor-executable instructions in order to cause the computing system to:

write a redo log entry to a master index server of the distributed database system; and write an entry referencing a removal of the service to be removed in a backup mechanism of the distributed database system.

29. The system of claim 27, wherein the deleting of an entry of the service to be removed from a startup configuration of the distributed database system causes the distributed database system to disable the service on a restart thereof.

30. The system of claim 27, wherein the internal topology information of the distributed database system stores meta data associated with a location, a state, a volume configuration, and combinations thereof for the service to be removed.

* * * * *